United States Patent
Sanghi et al.

(10) Patent No.: US 9,842,036 B2
(45) Date of Patent: Dec. 12, 2017

(54) METHODS AND APPARATUS FOR CONTROLLED RECOVERY OF ERROR INFORMATION BETWEEN INDEPENDENTLY OPERABLE PROCESSORS

(71) Applicant: Apple Inc., Cupertino, CA (US)

(72) Inventors: Karan Sanghi, San Jose, CA (US);
Saurabh Garg, San Jose, CA (US);
Vladislav Petkov, Cupertino, CA (US);
Haining Zhang, San Jose, CA (US)

(73) Assignee: Apple Inc., Cupertino, CA (US)

( * ) Notice: Subject to any disclaimer, the term of this patent is extended or adjusted under 35 U.S.C. 154(b) by 89 days.

(21) Appl. No.: 14/870,923

(22) Filed: Sep. 30, 2015

(65) Prior Publication Data

US 2016/0224442 A1     Aug. 4, 2016

Related U.S. Application Data

(60) Provisional application No. 62/112,061, filed on Feb. 4, 2015.

(51) Int. Cl.
*G06F 11/00* (2006.01)
*G06F 11/20* (2006.01)
(Continued)

(52) U.S. Cl.
CPC ...... *G06F 11/2028* (2013.01); *G06F 13/4022* (2013.01); *G06F 13/4221* (2013.01); *G06F 2201/805* (2013.01)

(58) Field of Classification Search
CPC .................................................. G06F 11/2028
(Continued)

(56) References Cited

U.S. PATENT DOCUMENTS 5,943,507 A    8/1999   Cornish et al.
6,553,446 B1   4/2003   Miller
(Continued)

FOREIGN PATENT DOCUMENTS

EP    3013008 A1    4/2016
JP    2013246642 A  12/2013

OTHER PUBLICATIONS

ECN L1 PM Substates with CLKREQ approved Aug. 23, 2012.
(Continued)

*Primary Examiner* — Dieu-Minh Le
(74) *Attorney, Agent, or Firm* — Gazdzinski & Associates, PC (57) ABSTRACT

Methods and apparatus for controlled recovery of error information between two (or more) independently operable processors. The present disclosure provides solutions that preserve error information in the event of a fatal error, coordinate reset conditions between independently operable processors, and implement consistent frameworks for error information recovery across a range of potential fatal errors. In one exemplary embodiment, an applications processor (AP) and baseband processor (BB) implement an abort handler and power down handler sequence which enables error recovery over a wide range of crash scenarios. In one variant, assertion of signals between the AP and the BB enables the AP to reset the BB only after error recovery procedures have successfully completed.

23 Claims, 6 Drawing Sheets

(51) Int. Cl.
*G06F 13/40* (2006.01)
*G06F 13/42* (2006.01)

(58) Field of Classification Search
USPC .................................. 714/11, 12, 13, 2, 6.12
See application file for complete search history.

(56) References Cited

U.S. PATENT DOCUMENTS

| | | | |
|---|---|---|---|
| 6,948,094 B2* | 9/2005 | Schultz | G06F 11/0772 |
| | | | 714/15 |
| 7,100,020 B1 | 8/2006 | Brightman et al. | |
| 7,941,682 B2 | 5/2011 | Adams | |
| 8,255,725 B2 | 8/2012 | Shimazaki et al. | |
| 8,352,624 B2 | 1/2013 | Zimmerman et al. | |
| 8,656,228 B2* | 2/2014 | Check | G06F 11/0724 |
| | | | 714/42 |
| 8,788,822 B1 | 7/2014 | Riddle | |
| 2002/0169938 A1 | 11/2002 | Scott et al. | |
| 2005/0285862 A1 | 12/2005 | Noda et al. | |
| 2007/0070997 A1 | 3/2007 | Weitz et al. | |
| 2010/0017655 A1 | 1/2010 | Gooding et al. | |
| 2010/0098419 A1 | 4/2010 | Levy et al. | |
| 2011/0219208 A1 | 9/2011 | Asaad et al. | |
| 2011/0320861 A1* | 12/2011 | Bayer | G06F 11/2033 |
| | | | 714/5.11 |
| 2015/0378737 A1 | 12/2015 | Debbage et al. | |
| 2016/0077989 A1 | 3/2016 | Pulyala et al. | |
| 2016/0103480 A1 | 4/2016 | Sanghi et al. | |
| 2016/0103689 A1 | 4/2016 | Sanghi et al. | |
| 2016/0103743 A1 | 4/2016 | Sanghi et al. | |
| 2016/0364350 A1 | 12/2016 | Sanghi et al. | |

OTHER PUBLICATIONS

PCI Express Base Specification Revision 3.1, published Oct. 8, 2014.
Universal Serial Bus, Communication Class, Subclass Specifications for Network Control Model (NCM) Devices: Revision 1.0 (Errata 1), Nov. 24, 2010, published by USB Implementers Forum, Inc.
PCI Express base Specification Revision 3.0, published Nov. 10, 2010.

* cited by examiner

METHODS AND APPARATUS FOR CONTROLLED RECOVERY OF ERROR INFORMATION BETWEEN INDEPENDENTLY OPERABLE PROCESSORS

PRIORITY AND RELATED APPLICATIONS

This application claims the benefit of priority to co-owned and U.S. Provisional Patent Application Ser. No. 62/112,061 of the same title filed Feb. 4, 2015, which is incorporated herein by reference in its entirety.

This application is also related to commonly owned and U.S. Provisional Patent Application Ser. No. 62/061,605 entitled "METHODS AND APPARATUS FOR AN INTER-PROCESSOR COMMUNICATION LINK BETWEEN INDEPENDENTLY OPERABLE PROCESSORS" filed Oct. 8, 2014, the foregoing incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

Technical Field

The disclosure relates generally to the field of consumer electronic devices, as well as networks thereof. More particularly, in one exemplary aspect, the disclosure is directed to methods and apparatus for controlled recovery of error information between two (or more) independently operable processors. Various aspects of the present disclosure are directed to e.g., preserving error information in the event of a fatal error, coordinating reset conditions between independently operable processors, and implementing consistent frameworks for error information recovery across a range of potential fatal errors.

SUMMARY

The present disclosure satisfies the foregoing needs by providing, inter alia, methods and apparatus for controlled recovery of error information between two (or more) independently operable processors.

In one aspect, a method for controlled recovery of error information between two or more independently operable processors is disclosed. In one embodiment, the method includes: detecting a crash event at one of the two or more independently operable processors; asserting a first signal, the first signal indicating that the crash event has occurred; performing one or more error recovery procedures to collect one or more error information; and when the one or more error recovery procedures have successfully completed, asserting a second signal, the second signal indicating that the one or more error recovery procedures have successfully completed.

In one variant, the method includes: receiving the collected one or more error information at a second processor of the two or more independently operable processors, responsive to the assertion of the second signal.

In a second variant, responsive to the assertion of the second signal indicating that the one or more error recovery procedures have successfully completed, the method includes waiting to receive a third signal at the one of the two or more independently operable processors, the third signal configured to reset the one of the two or more independently operable processors at which the crash event occurred.

In a third variant, at least two of the two or more independently operable processors includes a bus interface and the method further includes communicating via the bus interface in accordance with a Peripheral Component Interconnect Express (PCIe) standard. In one such case, the method further includes: verifying a state of a PCIe link; and when a PCIe bus is active, enumerating to the PCIe bus.

In a fourth variant, the acts of asserting the first and second signals include asserting via a general purpose input/output (GPIO).

In a fifth variant, when the crash event has been detected, the method includes completing one or more pending input/output transactions before the act of asserting the first signal.

In a second aspect of the present disclosure, a method for storing error information between two or more independently operable processors is disclosed. In one embodiment, the method includes: enabling a hardware safety mechanism configured to monitor for a crash event at one of the two or more independently operable processors; indicating that the crash event has occurred; initiating one or more error recovery procedures to store error information; and when the error information has been stored, indicating that the one or more error recovery procedures have successfully completed.

In one variant, when the one or more error recovery procedures have successfully completed, the method further includes disabling the hardware safety mechanism.

In a second variant, the method further includes analyzing the stored error information.

In a third variant, when one or more bus transactions are pending, the method further includes resolving the one or more bus transactions.

In a fourth variant, the act of resolving the one or more bus transactions includes transferring all remaining contents of a transmit buffer.

In a fifth variant, the act of resolving the one or more bus transactions includes aborting the one or more bus transactions.

In a third aspect, a computerized system configured to recover error information between two or more independently operable processors is disclosed. In one embodiment, the system includes: a bus interface; a first independently operable processor; and a second independently operable processor in data communication with the first processor via the bus interface, the second processor including a plurality of computer-readable instructions. In one such exemplary embodiment, the plurality of computer-readable instructions when executed by the second processor, cause the second processor to: detect a crash event; assert a first signal configured to indicate to the first processor that the crash event has occurred; perform one or more error recovery procedures to collect one or more error information; and when the one or more error recovery procedures have successfully completed, assert a second signal configured to indicate to the first processor that the one or more error recovery procedures have successfully completed.

In a first variant, responsive to the assertion of the second signal by the second processor, the first processor is configured to retrieve the one or more error information. In a second variant, responsive to the assertion of the second signal by the second processor, the first processor is configured to disable the bus interface and reset the second processor.

In a third variant, the first processor includes an applications processor, and the second processor includes a baseband processor.

In a fourth variant, the bus interface includes a Peripheral Component Interconnect Express (PCIe) bus.

In a fifth variant, the second processor further includes an abort handler.

In a fourth aspect, an apparatus configured to store error information between two or more independently operable processors is disclosed. In one embodiment, the apparatus includes: a physical bus interface configured to couple a first processor with a second processor; and a computer-readable medium including a plurality of instructions. In one exemplary embodiment, the computer-readable medium when executed by the second processor, cause the second processor to: enable a hardware safety mechanism configured to monitor for a crash event at the second processor; indicate to the first processor that the crash event has occurred; initiate one or more error recovery procedures to store error information; and when the error information has been stored, indicate to the first processor that the one or more error recovery procedures have successfully completed.

In one variant, the plurality of instructions are further configured to, when executed, enter a loop to await further instructions when the one or more error recovery procedures have successfully completed. In one such case, the plurality of instructions are further configured to, when executed, cause a reset of the second processor.

In another variant, the plurality of instructions are further configured to, when executed, complete outstanding bus transactions before the enablement of the hardware safety mechanism.

Other features and advantages of the present disclosure will immediately be recognized by persons of ordinary skill in the art with reference to the attached drawings and detailed description of exemplary embodiments as given below.

All Figures © Copyright 2015 Apple Inc. All rights reserved.

DETAILED DESCRIPTION

Reference is now made to the drawings, wherein like numerals refer to like parts throughout.

Detailed Description of Exemplary Embodiments

Exemplary embodiments of the present disclosure are now described in detail. While these embodiments are primarily discussed in the context of the Peripheral Component Interconnect Express (PCIe) standard (e.g., as is described in "PCI Express Base Specification Revision 3.1" published Oct. 8, 2014), it will be recognized by those of ordinary skill that the present disclosure is not so limited. In fact, the various aspects of the disclosure are useful in any device or network of devices that is configured to incorporate and coordinate multiple independent processing elements as is disclosed herein.

While the following embodiments describe specific implementations of e.g., error information, communication protocols between independently operable processors, and consistent frameworks for error information recovery across a range of potential fatal errors, those of ordinary skill in the related arts will readily appreciate that such descriptions are purely illustrative of the broader principles described herein.

Exemplary Independent Processor Operation—

Historically, most computing devices have been designed according to the Personal Computer (PC) paradigm, where a single processor is largely responsible for managing software execution. However, computing devices have significantly evolved to fit a diverse ecosystem of designs and uses; additionally, processor technologies have improved, offering significant computing power at near commodity prices. Within the context of consumer electronics (e.g., personal wireless devices (such as the iPhone), personal media devices (such as the iPad/iPod), and personal computers (such as the MacBook Pro and MacBook Air)), various considerations have resulted in designs which utilize multiple independent processor operation.

For example, in typical wireless devices, an applications processor (AP) operates independently from a wireless baseband modem processor (BB). During normal operation, the wireless device may selectively use one or both of the AP and BB, depending on the particular application. When either the AP or BB is not in active use (or in preparation for use, etc.), the processor is put to sleep so as to reduce power consumption, etc. Conceptually similar design paradigms are used for media devices (where the media processor is independent from an applications processor), etc.

Unfortunately, while devices have steadily increased in complexity, coordinating operation between multiple independent processors has been largely overlooked. For example, bus technologies have evolved which are able to handle faster data rates and provide higher levels of data throughput. One such example is Peripheral Component Interconnect Express (PCIe). PCIe has historically been used as a high-speed serial computer expansion bus technology; PCIe is based on point-to-point connectivity with separate serial links connecting every endpoint component (e.g., graphics card, memory, etc.) to the root complex (e.g., host processor). However, existing PCIe technologies consume significant power and are unsuitable for designs where the "peripheral" processor is required to operate while the "host" processor is asleep or vice versa (as is common with cellular devices, portable laptops, and/or other portable media players).

During typical operation, the PCIe bus may experience unexpected conditions caused by e.g., unknown messages, software and/or hardware errors, erratic interference, etc. Existing PCIe bus technologies are notorious for their unreliability in resolving unexpected bus states. For example, within certain computer systems, a PCIe failure results in a fatal error (e.g., the so-called "Blue Screen of Death") which requires the user to reset the computer system. While those of ordinary skill in the related arts will readily appreciate that there are a wide range of possible sources of unexpected fatal error conditions (e.g., poorly written device drivers, memory leaks, etc.), it is appreciated that more complex hardware, software, and bus topologies invariably increases the probability of error conditions.

Furthermore, error recovery methodologies are fragmented within the processor arts. For example, some processors gather and provide error information in the event of an unexpected crash (so-called "core dump" files, and/or debugging information, etc.). Other processors may try to recover the system by forcing other peripherals/processors to reboot (e.g., to return to a known state of operation). Still other processors may use a so-called "panic mode" which power cycles the entire device thereby completely resetting device context. Since software crashes can occur in a wide variety of scenarios and each processor cannot tell for sure whether the other processors are still operational, different processors within the same device may implement multiple different methodologies in a haphazard manner. For example, an AP may reset the BB while the BB is attempting to gather useful debugging information, etc. In these worst case scenarios, even where potentially useful debugging information has been gathered, design engineers cannot determine whether the debugging information was gathered before, during, or after the failure; in some cases, the debugging information may even have been corrupted, etc.

Within this context, methods and apparatus are now described which enable controlled recovery of error information between two (or more) independently operable processors. Ideal solutions preserve error information in the event of a fatal error, coordinate reset conditions between independently operable processors, and implement consistent frameworks for error information recovery across a range of potential fatal errors. The following discussions are described in reference to a "root complex" (RC) (or "host") processor, and an "endpoint" (EP) (or "peripheral") processor. For reasons which will become apparent below, it is appreciated that the designation as to host or peripheral processor is used to simplify and/or clarify the following explanations, and does not imply existing host or peripheral functionality.

As used herein, the term "logical" or "virtual" are interchangeably used to refer to an abstraction (typically performed in software or machine logic) to represent physical mechanisms, attributes or functionalities as a data structure. For example, a "logical bus interface", "virtual bus interface", etc. refers generally to an abstraction or representation of a bus interface as a series of data structures. In contrast, as used herein a "physical bus interface" refers to the physical mechanisms, attributes or functionalities of a physically tangible bus interface.

Exemplary Apparatus—

Figure 1:
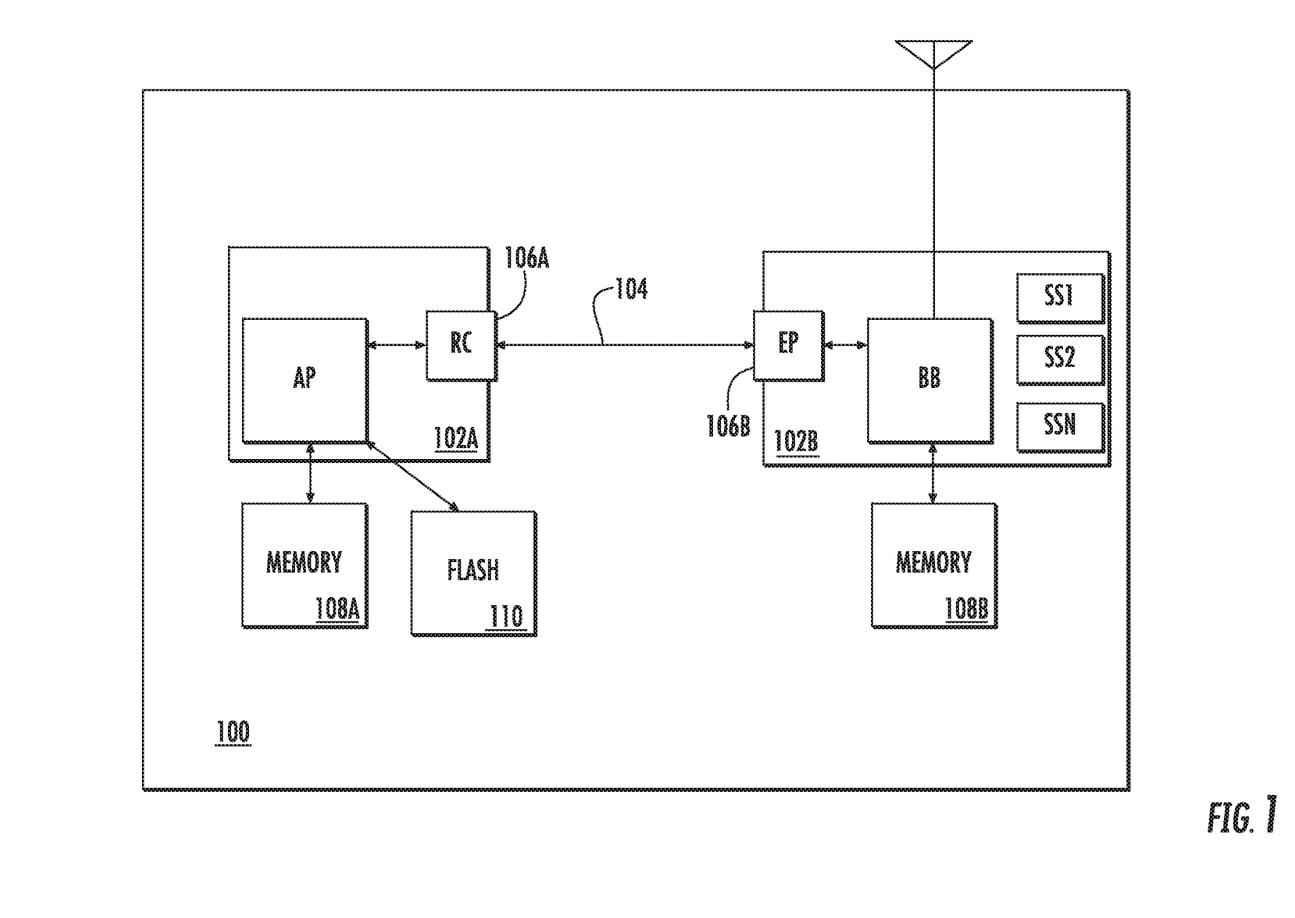
FIG. 1 is a logical block diagram representing one exemplary apparatus useful for illustrating various principles described herein.

FIG. 1 illustrates one exemplary apparatus 100 useful for illustrating various principles described herein. As shown, the apparatus 100 includes a first and second processor (102A, 102B), and a physical bus interface 104 that is configured to implement a communication link between the two (or more) independently operable processors.

In one implementation, the first processor 102A includes an applications processor (AP). As shown in FIG. 1, the first processor 102A is coupled to a Root Complex (RC) 106A which functions as the host of the communication link. In one implementation, the second processor 102B includes a wireless modem baseband (BB). In other embodiments, the second processor 102B may be e.g., a media processor, or other network processing element. As shown in FIG. 1, the second processor 102B is coupled to an Endpoint (EP) 106B which functions as the peripheral of the communication link.

As shown, both the first and the second processors (102A, 102B) are each coupled to a non-transitory computer readable medium (e.g., random access memory (RAM)) (108A, 108B). The non-transitory computer readable medium is configured to store computer readable instructions for execution. As used herein, the term "memory" includes any type of integrated circuit or other storage device adapted for storing digital data including, without limitation, ROM, PROM, EEPROM, DRAM, SDRAM, DDR/2 SDRAM, EDO/FPMS, RLDRAM, SRAM, "flash" memory (e.g., NAND/NOR), and PSRAM. In some cases, the first and/or second processors may have an associated non-volatile memory 110 (e.g., a Flash memory) which is configured to store computer readable instructions, and retain the stored computer readable instructions without power.

In one exemplary embodiment, the first processor 102A and associated memory 108A are configured to manage the second processor, transmit and receive interrupts, host interprocessor communications (via the communication link), and operate as the root complex of the communications bus. In contrast, the second processor 102B and associated memory 108B are configured to operate as an endpoint (EP) of the communication bus, respond as a slave to the interprocessor communications, assert and de-assert GPIO, and handle various abort scenarios. Additionally, the second processor 102B may operate in a variety of processing capacities (e.g., as a baseband processor for a wireless modem), and/or manage a plurality of subsystems (e.g., audio codecs, display drivers, manage wireless modem components, etc.).

Figure 2:
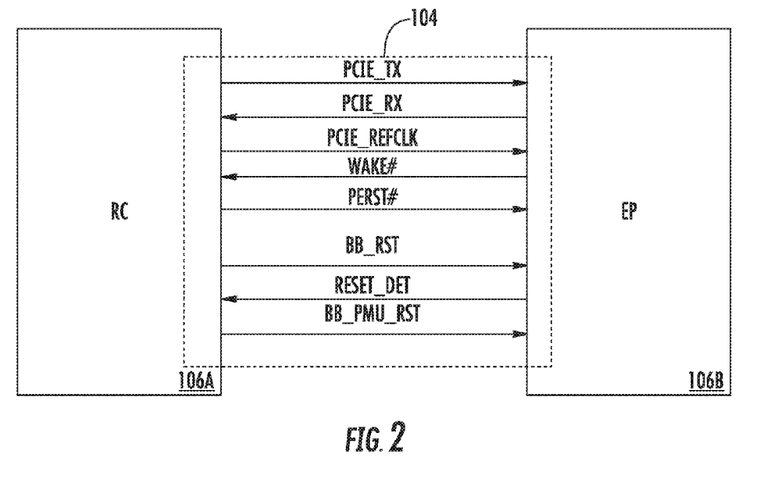
FIG. 2 is a logical block diagram representing one exemplary physical bus interface useful for illustrating various principles described herein.

As shown in FIG. 2, one embodiment of the physical bus interface 104 is loosely based on the Peripheral Component Interconnect Express (PCIe) standard (e.g., as is described in "PCI Express Base Specification Revision 3.1" published Oct. 8, 2014, and "ECN L1 PM Substates with CLKREQ" approved Aug. 23, 2012, incorporated by reference herein in their entireties). Modifications to the traditional PCIe physical bus interface 104 (and protocols used therewith) to support crash recovery functionality is described in greater detail hereinafter. Those of ordinary skill in the related arts, given the contents of the present disclosure, will readily appreciate that other bus interface standards may be substituted with equal success. For example, the PCIe interface may be modified to operate as an inter-processor communication (IPC) link, as described in commonly owned and co-pending U.S. Provisional Patent Application Ser. No. 62/061,605 entitled "METHODS AND APPARATUS FOR AN INTER-PROCESSOR COMMUNICATION LINK BETWEEN INDEPENDENTLY OPERABLE PROCESSORS", filed Oct. 8, 2014, previously incorporated supra.

In the exemplary embodiment, the physical bus interface 104 is a point-to-point communication channel between two PCIe ports (the RC and EP) allowing both to send/receive access requests (configuration read/write, I/O read/write, memory read/write) and interrupts. At the physical level, a link is composed of one or more lanes (one shown in FIG. 2), each lane having receive and transmit component (pcie_rx, pcie_tx). Each lane is a full-duplex byte stream, transporting data packets in eight-bit "byte" formats, between the RC and EP of a link, in both directions simultaneously. The physical link 104 can support multiple logical links (or virtual bus interfaces) representing multiple ongoing data sessions.

In addition, the physical bus interface 104 further includes three (3) signals which enable crash recovery. In one exemplary embodiment, the signals are implemented via general purpose input/output (GPIO): (i) BB_PMU_RST GPIO, (ii) BB_RST GPIO, and (iii) RESET_DET GPIO. The BB_PMU_RST GPIO is a GPIO from the RC to the EP which when toggled causes the EP to power off. The BB_RST GPIO is a GPIO from the RC to the EP, which when toggled causes the EP to reset. The RESET_DET GPIO is provided from the EP to the RC, and is asserted when the EP is reset. In one embodiment, the PCIe WAKE# GPIO is provided from the EP to the RC as part of the PCIe interface, but it is additionally "overloaded" so as to be asserted when the EP has concluded its own error recovery process (e.g., successfully stored a core dump to RAM). Alternative embodiments may dedicate a GPIO for asserting successful completion of the error recovery process.

Exemplary Boot Process, and Sleep/Wake Procedures—

As a brief aside, a brief summary of one boot sequence useful in conjunction with the exemplary apparatus 100 is provided herein. In the interest of conciseness and clarity, the following discussion is neither comprehensive nor exclusionary, and those of ordinary skill in the related arts will readily appreciate that other schemes for booting multiple independent processors may be readily substituted, the following merely provided so as to assist in the application of the subsequent procedures detailed hereinafter.

Upon power-on or reset, the apparatus 100 initializes the second processor 102B (BB) which retrieves the primary boot loader (PBL) non-volatile memory such as onboard read only memory (ROM) (or other flash memory). At the same time (or prior to the BB boot sequence), the first processor 102A (AP) initializes, boots, and runs its operating system (OS).

Once the BB 102B has successfully powered on (or woken, etc.), the AP 102A powers the physical bus interface 104 (e.g., PCIe bus) and enumerates the link. In one exemplary implementation, the AP 102A enumerates itself and the BB processor 102B over the PCIe bus 104. Upon successful enumeration, the AP retrieves the BB secondary boot loader (SBL) and sends it via the PCIe bus to the BB. The BB receives the SBL and responsively boots from the SBL.

Once the BB 102B starts executing the SBL, the AP 102A fetches the BB's 102B final software image and sends it to the BB 102B over the physical bus interface 104. Thereafter, the BB 102B executes its final software image (e.g., the operating system (OS)). At the conclusion of the boot procedure, both AP and BB run their corresponding OS.

As previously alluded to, the AP and BB are independently functioning processors which may each separately enter/exit sleep mode. In some embodiments, when the AP is sleeping, the communication link is disconnected. In other embodiments, when either (or both) of the AP or the BB are sleeping, the communication link is disconnected. Upon waking, the communication link re-enumerates to enable communication. Unfortunately, in existing prior art designs the AP assumes that the enumeration always succeeds; thus, if the BB responds in an unexpected manner, the AP automatically enters a "panic mode" (i.e., the AP power cycles the entire device in order to reset to a known condition) since the AP cannot determine whether itself or the BB is in an unknown state. From a consumer's point of view, this is a highly undesirable consequence which is obvious when observed.

From a practical standpoint, there are many reasons why a BB may not successfully enumerate (resulting in the undesirable "panic mode"). For example, the BB may not be responsive during so-called "abort handler" operations. In one such implementation, the BB is composed of multiple subsystems (e.g., wireless modem, codecs, power management, etc.); while each of these subsystems is generally quite robust, it is economically infeasible to predict/eliminate all "bugs" in the software/hardware. Consequently, the exemplary BB software includes an abort handler which is configured to collect debugging information when a failure is observed. In particular, one type of debugging information is a so-called "core dump" where the processor copies the contents of execution memory to non-execution space such that it can be analyzed later. Once the core dump has been successfully stored, the BB executes a null command until instructed otherwise (e.g., "spins" in a while loop); subsequently thereafter, the AP can reset the BB and retrieve the core dump as part of the PBL/SBL process. Unfortunately, the BB will not respond to PCIe commands when retrieving/storing core dumps (which can be on the order of several seconds); in other words, if the AP attempts to enumerate the BB during the interval between the initial crash and the null command execution, then the BB will not respond and the AP will trigger the panic mode response.

Various embodiments of the present disclosure are applicable to any system of components where a host processor is unaware that the slave processor has crashed. More generally, those of ordinary skill in the related arts will readily appreciate that the principles described herein are broadly applicable to any system where one processor of two (or more) independently operable processors must coordinate with the other processor(s) to recover error information (e.g., core dumps, debugging logs, etc.).

Exemplary Framework—

TABLE 1 illustrates one exemplary framework useful in conjunction with the exemplary apparatus of FIG. 1. As shown, the framework identifies the appropriate action performed by the application processor (AP) and baseband (BB).

TABLE 1

| Crash Scenario | BB Execution Environment | RESET_DET | PCIe Link State | AP Behavior |
| --- | --- | --- | --- | --- |
| Software Crash | Abort Handler | Assert | Up | Collect Core dump |
| HW Watchdog Expiration | ROM | Assert | Down | Collect Core dump |
| Soft Reset, Shutdown | Power Down Handler | Assert | Up | Explicitly reset/power down the BB via GPIO |
| PCIe Link Down | OS | De-assert | Down | Panic |

TABLE 1-continued

| Crash Scenario | BB Execution Environment | RESET_DET | PCIe Link State | AP Behavior |
|---|---|---|---|---|
| PCIe Link Down | Abort Handler | Assert | Down | Collect Core dump |
| PCIe Timeout, AP Detects | OS | De-assert | Up | Collect Core dump |
| PCIe Abort, AP Detects | OS | De-assert | Up | Panic |
| PCIe Timeout, BB Detects | OS | De-assert | Up -> Down | Panic |
| PCIe Timeout, BB Detects | Abort Handler | Assert | Up | Collect Core dump |
| PCIe Abort, BB Detects | Abort Handler | Assert | Up | Collect Core dump |

The various entities of summarized in TABLE 1 are now described in greater detail.

Abort Handler—

Figure 3:
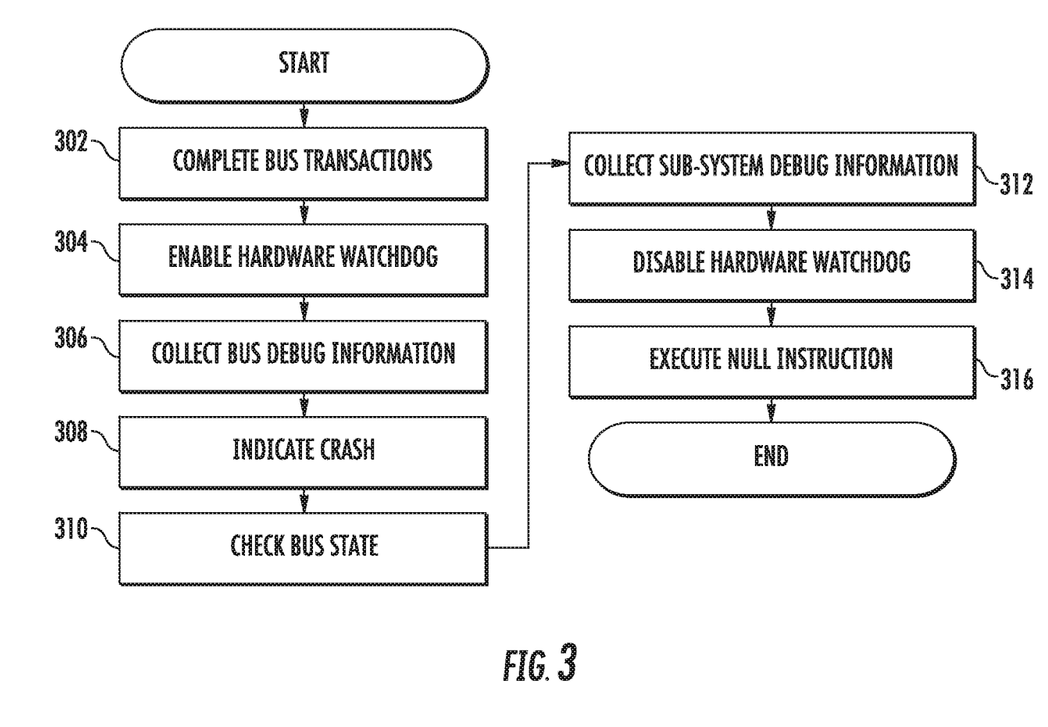
FIG. 3 is a logical flow diagram of one exemplary method for handling an abort sequence, in accordance with the principles of the present disclosure.

FIG. 3 illustrates one logical flow diagram of an exemplary method 300 for handling an abort sequence.

At step 302 of the method 300, the abort handler ensures all (if any) ongoing PCIe bus transactions are completed. In some cases, this may include completing the transfer of the remaining contents of a transmit buffer, in other cases the transfer is abbreviated in an expected manner (e.g., by terminating the transfer according to a predefined protocol, etc.). In still other embodiments, the transfer may be aborted by sending a terminating signal and/or packet, etc.

At step 304, the abort handler enables the hardware watchdog. As described in greater detail hereinafter, the hardware watchdog is a dedicated hardware safety mechanism to ensure that even where software has failed to respond, the processor can return to a known state by resetting itself.

At step 306, the abort handler collects the PCIe debug information and stores the bus error information to a non-execution memory for subsequent analysis. While execution memory will not be preserved in the course of a reset (e.g., it may be overwritten during execution, etc.); in contrast, non-execution memory can be preserved and thus the error information can be recovered even after the system has been reset.

At step 308, the abort handler de-asserts the PCIe WAKE# GPIO and asserts the RESET_DET GPIO, thereby indicating to the AP that the BB has crashed. As previously alluded to, RESET_DET GPIO is asserted by the BB to indicate the occurrence of a crash event, thereby allowing the AP to prevent further transactions with the BB. However, the BB additionally performs non-trivial error recovery tasks in the event of a crash, thus WAKE# GPIO has been overloaded to indicate to the AP that the BB has finished its error recovery tasks. By de-asserting the WAKE# GPIO, the BB indicates to the AP that the error recovery tasks are ongoing.

At step 310, the abort handler checks the PCIe link state. If the link is down, then it waits for the PERST# de-assertion for a preconfigured amount of time; if the preconfigured amount of time elapses, then the abort handler proceeds to the next step (step 312). Otherwise, if the PERST# de-asserts, then the abort handler enables the PCIe bus clocks for enumeration (re-enumeration).

Thereafter, the abort handler collects debugging information from e.g., the baseband core, the subsystems, etc. and stores the debugging information to a non-execution memory for subsequent analysis (step 312).

Once debug information has been correctly stored, the abort handler asserts the WAKE# GPIO (step 314), disables the hardware watchdog (step 316), and executes null instructions (e.g., spinning in a while loop) until instructed otherwise. By asserting the WAKE# GPIO, the BB indicates to the AP that it has completed the error recovery procedures.

In one exemplary embodiment, the method 300 (or a portion thereof) is bounded by specified time constraints (e.g., maximum/minimum time duration). For example, in one such implementation, the time interval from when the BB starts executing the abort handler (time 302) to when the baseband checks the PCIe link state (step 310) is required to be less than 10 milliseconds (ms).

In brief, the AP is configured to detect the baseband crash via the RESET_DET GPIO assertion, and further to detect when the BB has completed its error recovery procedures via the WAKE# GPIO assertion. Only after the error recovery procedures have successfully completed does the AP assert the BB_RST GPIO, causing the reset of the BB.

Power Down Handler—

Figure 4:
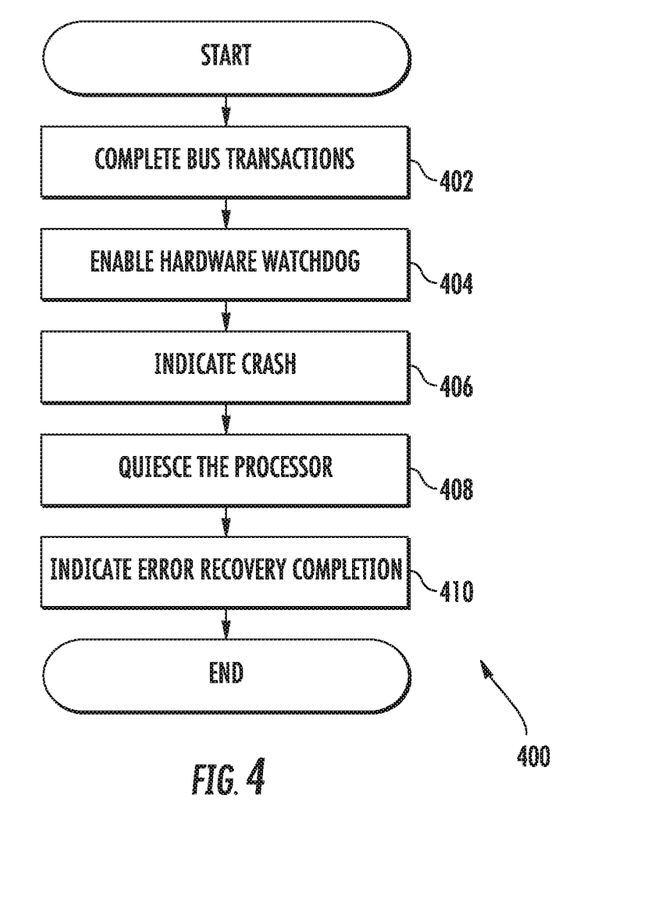
FIG. 4 is a logical flow diagram of an exemplary method for handling a power down sequence, in accordance with the principles of the present disclosure.

FIG. 4 illustrates one logical flow diagram of an exemplary method 400 for handling a power down sequence. In some embodiments, the power down handler is incorporated within the abort handler; alternatively the power down handler may be physically or logically distinct from the abort handler.

When the BB is powered off via a command sent from the AP, the BB will execute its power down handler. First the power down handler ensures all (if any) ongoing PCIe bus transactions are completed (step 402).

At step 404, the power down handler enables the hardware watchdog timer. In one variant, if the PCIe link was up before the watchdog expired, then the AP will detect the PCIe link down event caused by the reset.

At step 406, the BB signals that a baseband crash has occurred. In one embodiment, the BB asserts RESET_DET GPIO and de-asserts WAKE# GPIO.

At step 408, the BB quiesces any existing running processes and performs error recovery. More generally, the BB pauses, halts, suspends, or otherwise alters the state of running processes so as to prevent further changes to execution memory. In some variants the BB may additionally store the contents of execution memory to non-execution memory for subsequent analysis. In some cases, the BB completes outstanding writes/reads. In other implementations, outstanding writes/reads are flushed. Various other schemes for stabilizing the execution of computer processes in anticipation of crash recovery will be readily appreciated by those of ordinary skill in the related arts, given the contents of the present disclosure.

At step 410, once the BB has completed the quiescing operation, the BB asserts the PCIe WAKE# GPIO to indicate that error recovery has successfully completed. Thereafter, the BB may disable the hardware watchdog timer and spin in a while loop (or some other form of null command execution).

Once the AP detects that both WAKE# and RESET_DET GPIO have been asserted, the AP powers the BB off via BB_PMU_RST GPIO.

Common Crash Scenarios—

Referring back to TABLE 1, various common crash scenarios are now described in greater detail.

Firstly, in the event of a software crash, the BB enters its abort handler. The PCIe link state between the AP and the BB remain unchanged. The BB executes the abort handler, and asserts RESET_DET GPIO. Thereafter, when the AP detects the BB crash and successful completion of the BB abort handler sequence (e.g., via the RESET_DET and WAKE# assertions), then the AP resets the BB by first powering off the PCIe port, resetting the BB via BB_RST GPIO, and then powering on the PCIe port. Then the BB will responsively enumerate over PCIe in ROM, and the AP can subsequently collect the core dumps.

Similarly, certain crashes can occur due to a hardware watchdog expiring. The hardware watchdog is a dedicated hardware component which is configured to reset the BB if its timer is allowed to expire. During normal operation, the watchdog timer is periodically reset by the processor before it runs completely down; however, when the processor is in an unknown state and unable to reset the watchdog, then the watchdog timer expires and resets the processor. This results in the processor re-executing its ROM. In the exemplary embodiment, when the BB is reset the AP will detect a PCIe link down event (if the PCIe link was active). Responsively, the AP waits until successful completion of the BB abort handler sequence (e.g., via the RESET_DET and WAKE# assertions), and thereafter the AP resets the BB by first powering off the PCIe port, resetting the BB via BB_RST GPIO, and then powering on the PCIe port. As with the aforementioned software crashes, the AP can subsequently collect the core dumps.

In some cases, the AP may explicitly trigger a soft reset or shutdown. In these scenarios, the BB executes its power down handler and the PCIe link remains operational. Thereafter, the AP powers the PCIe link down, and thereafter resets the BB via BB_RST GPIO or powers the BB down via BB_PMU_RST.

As shown in TABLE 1, there are multiple scenarios that address PCIe link failure. For example, in some embodiments, the default behavior for the BB is to execute the abort handler in the event of a PCIe link failure. On entering the abort handler, the BB asserts the RESET_DET GPIO, which results in the AP treating the PCIe link failure as a BB crash. As with the aforementioned scenarios, the AP will wait for the BB to complete the abort handler execution before resetting the PCIe link, re-enumerating the BB, and retrieving the core dumps, etc. Under this scenario, the AP can retrieve error information from the EP interface (within the BB), however the AP may not be able to retrieve the error information within the RC.

Alternatively, in some special cases, the BB may remain within the operating system (OS) during a PCIe link failure. For example, the AP may configure the BB to remain in the OS in order to assist with software debugging of the AP. In these scenarios, the BB will not assert RESET_DET GPIO (indicating that the BB is not in reset). The IPC driver on the host will detect the PCIe link failure and that the BB is not reset. Consequently, the AP will trigger a panic mode to allow debug of the PCIe link on the RC. In these scenarios, since the BB does not execute its abort handler functionality, all of the BB error information is lost.

Moreover, there are also scenarios where the PCIe link fails independent of either the AP or BB. For example, in some cases, the AP may detect a completion timeout over PCIe link, while the BB is still running normally (e.g., as evidenced by RESET_DET GPIO remaining de-asserted). Here, the AP IPC driver will explicitly power off the PCIe port. The BB will recognize the PCIe link failure and either: (1) execute the abort handler; or else (2) stay within the OS (depending on configuration). Thereafter, the AP will treat the completion timeout as a fatal baseband error and trigger a baseband reset.

In contrast, where the BB detects a completion timeout over the PCIe link, then under default operation the BB will enter the abort handler and assert the RESET_DET GPIO. Thereafter the AP can treat the failure as a BB crash. As previously noted, the default operation enables the AP to debug link level issues based on the error information within the EP interface, however the information within the RC is lost. Alternatively, if the BB is configured to remain in the OS to assist in AP debugging, then the BB will explicitly bring the PCIe link down without asserting RESET_DET GPIO. The AP will detect the link failure and the de-asserted RESET_DET GPIO; consequently the AP will trigger a panic mode. In this crash scenario, the AP can debug the RC interface but will lose the information stored within the EP (because the BB abort handler was not executed).

If the AP detects a PCIe completion abort (i.e., a fatal error), then the AP will trigger panic mode. If the BB detects a PCIe completion abort, then the BB will execute the abort handler; the AP will treat the failure as a BB crash.

Example Operation—

Figure 5:
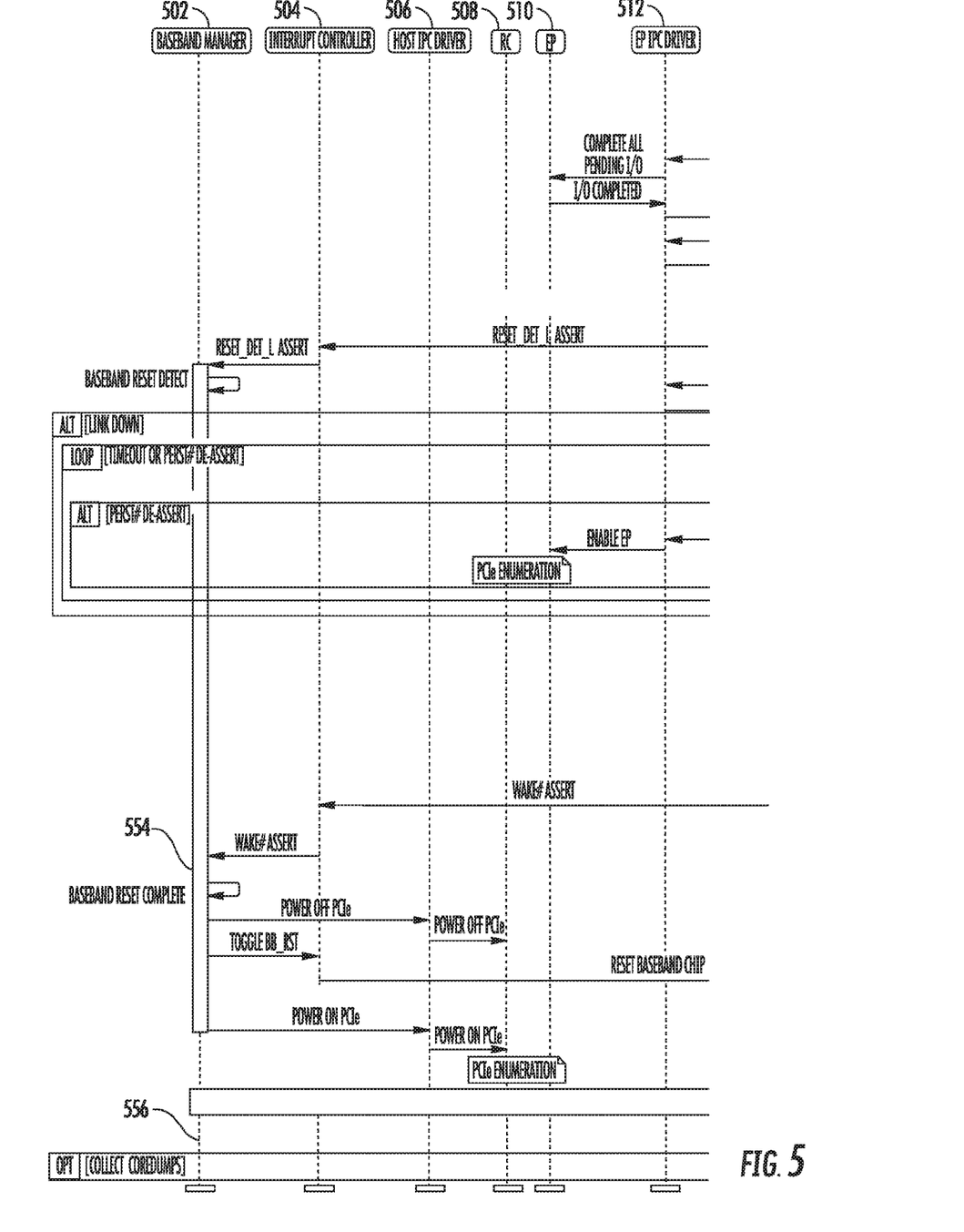
FIG. 5 is a logical flow diagram of one logical ladder diagram which embodies an error recovery procedure, in accordance with the principles of the present disclosure.

Referring now to FIG. 5, one logical ladder diagram is illustrated which embodies an error recovery procedure in accordance with the present disclosure. As shown, the application processor (AP) (host) includes the logical entities of: (i) the baseband manager 502, (ii) the interrupt controller 504, (iii) the host inter-processor communication (IPC) driver 506, and (iv) the root complex (RC) interface 508. The baseband processor (BB) (slave) includes: (i) the endpoint (EP) interface 510, (ii) the EP IPC driver 512, (iii) the GPIO controller 514, (iv) the abort handler 516, (v) the baseband core 518, and (vi) a plurality of subsystems 520 (e.g., audio, display, wireless modem, etc.).

At some unexpected time during operation, the BB crashes (time 550). Typically, a software crash is evidenced by unexpected behavior from one of the subsystems 520 (e.g., an errant memory access, a non-responsive bus access, etc.). Responsively, the baseband core 518 jumps to its abort handler sequence, which enables a hardware watchdog. The hardware watchdog ensures that if the abort handler 516 is unable to gracefully complete its tasks, then the BB will be forced into reset. As shown, the abort handler 516 must complete all pending input/output transactions, and collect debug information. Successful completion of the abort handler de-asserts WAKE# and asserts the RESET_DET GPIO.

The assertion of RESET_DET GPIO indicates to the AP that the BB has crashed (time 552) and no further transactions with the BB should be initiated; however, the AP waits until the baseband reset is complete (time 554) before powering the PCIe bus down and resetting the baseband core 518.

After the baseband core 518 is reset, it executes the contents of its ROM. Concurrently, the AP powers the PCIe bus and awaits PCIe enumeration before executing a primary boot loader (PBL) and secondary boot loader (SBL) boot protocol. Thereafter, the AP may safely collect the core dumps 556.

Referring back to the interval of time between baseband reset detection (time 552) and baseband reset completion (time 554), the abort handler 516 is allowed to verify the PCIe link state and if the PCIe bus is active, enumerate to the PCIe bus. Regardless, the abort handler 516 can collect debug information from each of the subsystems 520. Once the abort handler 516 has successfully gathered the debug information (e.g., core dumps), the abort handler 516 asserts WAKE# (indicating that baseband reset is complete). Thereafter, the abort handler disables the hardware watchdog and executes null commands.

More generally, unlike existing solutions which do not coordinate error recovery procedures, various embodiments of the present disclosure provide an indication as to both when a crash has occurred and when the error recovery associated with the crash has completed. In this manner, the other processors of the system do not reset the crashed processor before it can recover and store the relevant error information.

It will be recognized that while certain embodiments of the present disclosure are described in terms of a specific sequence of steps of a method, these descriptions are only illustrative of the broader methods described herein, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure and claimed herein.

While the above detailed description has shown, described, and pointed out novel features as applied to various embodiments, it will be understood that various omissions, substitutions, and changes in the form and details of the device or process illustrated may be made by those skilled in the art without departing from principles described herein. The foregoing description is of the best mode presently contemplated. This description is in no way meant to be limiting, but rather should be taken as illustrative of the general principles described herein. The scope of the disclosure should be determined with reference to the claims.

What is claimed is:

1. A method for controlled recovery of error information between two or more independently operable processors, the method comprising:
    enabling a hardware safety mechanism at one of the two or more independently operable processors;
    detecting a crash event at the one of the two or more independently operable processors via the hardware safety mechanism;
    when the crash event has been detected, automatically asserting a first signal to another one of the two or more independently operable processors, the first signal indicating that the crash event has occurred thereby preventing further transactions from the other one of the two or more independently operable processors;
    performing one or more error recovery procedures to collect one or more error information, the performing being independent of the other one of the two or more independently operable processors; and
    when the one or more error recovery procedures have successfully completed based on storing the collected one or more error information, asserting a second signal to the other one of the two or more independently operable processors, the second signal indicating that the one or more error recovery procedures have successfully completed.

2. The method of claim 1, further comprising:
    transmitting the collected one or more error information to the other one of the two or more independently operable processors, responsive to the assertion of the second signal.

3. The method of claim 1, further comprising, responsive to the assertion of the second signal indicating that the one or more error recovery procedures have successfully completed, waiting to receive a third signal at the one of the two or more independently operable processors, the third signal configured to reset the one of the two or more independently operable processors at which the crash event occurred.

4. The method of claim 1, wherein at least two of the two or more independently operable processors comprises a bus interface disposed there between, and the method further comprises communicating via the bus interface in accordance with a Peripheral Component Interconnect Express (PCIe) standard.

5. The method of claim 4, further comprising:
    verifying a state of a PCIe link; and
    when a PCIe bus is active, enumerating to the PCIe bus.

6. The method of claim 1, wherein the acts of asserting the first and second signals comprise asserting via a general purpose input/output (GPIO).

7. The method of claim 1, further comprising, when the crash event has been detected, completing one or more pending input/output transactions before the act of asserting the first signal.

8. A method for storing error information between two or more independently operable processors, the method comprising:
    enabling a hardware safety mechanism configured to monitor for a crash event at one of the two or more independently operable processors;
    indicating that the crash event has occurred via the hardware safety mechanism, the indicating comprising automatically asserting a signal to another one of the two or more independently operable processors;
    initiating one or more error recovery procedures to store error information, the initiating being independent of the other one of the two or more independently operable processors; and
    when the error information has been stored, indicating that the one or more error recovery procedures have successfully completed.

9. The method of claim 8, further comprising, when the one or more error recovery procedures have successfully completed, disabling the hardware safety mechanism.

10. The method of claim 8, further comprising analyzing the stored error information.

11. The method of claim 8, further comprising, when one or more bus transactions are pending, resolving the one or more bus transactions.

12. The method of claim 11, wherein the act of resolving the one or more bus transactions comprises transferring all remaining contents of a transmit buffer.

13. The method of claim 11, wherein the act of resolving the one or more bus transactions comprises aborting the one or more bus transactions.

14. A computerized system configured to recover error information between two or more independently operable processors, the system comprising:
- a bus interface;
- a first independently operable processor; and
- a second independently operable processor in data communication with the first independently operable processor via the bus interface, the second independently operable processor comprising a plurality of computer-readable instructions which, when executed by the second independently operable processor, cause the second independently operable processor to:
  - detect a crash event via a hardware safety mechanism;
  - assert a first signal configured to indicate to the first independently operable processor that the crash event has occurred thereby preventing further transactions from the first independently operable processor;
  - perform one or more error recovery procedures to collect one or more error information, the performance being independent of the first independently operable processor; and
  - when the one or more error recovery procedures have successfully completed based on storage of the collected one or more error information, assert a second signal configured to indicate to the first processor that the one or more error recovery procedures have successfully completed.

15. The system of claim 14, wherein, responsive to the assertion of the second signal by the second processor, the first processor is configured to retrieve the one or more error information.

16. The system of claim 14, wherein, responsive to the assertion of the second signal by the second processor, the first processor is configured to disable the bus interface and reset the second processor.

17. The system of claim 14, wherein the first processor comprises an applications processor, and the second processor comprises a baseband processor.

18. The system of claim 14, wherein the bus interface comprises a Peripheral Component Interconnect Express (PCIe) bus.

19. The system of claim 14, wherein the second processor further comprises an abort handler.

20. An apparatus configured to store error information between two or more independently operable processors, the apparatus comprising:
- a physical bus interface configured to couple a first processor with a second processor; and
- a computer-readable medium comprising a plurality of instructions, which when executed by the second processor, cause the second processor to:
  - enable a hardware safety mechanism configured to monitor for a crash event at the second processor;
  - indicate to the first processor that the crash event has occurred, the indication comprising an assertion of a signal to first processor;
  - initiate one or more error recovery procedures to store error information, the initiation being independent of the first processor; and
  - when the error information has been stored, indicate to the first processor that the one or more error recovery procedures have successfully completed.

21. The apparatus of claim 20, wherein the plurality of instructions are further configured to, when executed, enter a loop to await further instructions when the one or more error recovery procedures have successfully completed.

22. The apparatus of claim 21, wherein the plurality of instructions are further configured to, when executed, cause a reset of the second processor.

23. The apparatus of claim 20, wherein the plurality of instructions are further configured to, when executed, complete outstanding bus transactions before the enablement of the hardware safety mechanism.

* * * * *